United States Patent [19]

Abbott et al.

[11] Patent Number: 5,968,862
[45] Date of Patent: *Oct. 19, 1999

[54] TRANSITION METAL-MAGNESIUM CATALYST PRECURSORS FOR THE POLYMERIZATION OF OLEFINS

[75] Inventors: Ronald G. Abbott, Kingwood, Tex.; Michael J. Krause, East Brunswick, N.J.; David L. Beach, Kingwood, Tex.

[73] Assignee: Chevron Chemical Company, San Ramon, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/487,369

[22] Filed: Jun. 7, 1995

Related U.S. Application Data

[63] Continuation of application No. 08/358,444, Dec. 19, 1994, abandoned, which is a continuation-in-part of application No. 08/164,501, Mar. 10, 1994, abandoned, which is a continuation-in-part of application No. 08/259,823, Jun. 15, 1994, abandoned, which is a continuation-in-part of application No. 07/896,271, Jun. 10, 1992, abandoned.

[51] Int. Cl.$^6$ ............................. C08F 4/64; B01J 31/00
[52] U.S. Cl. ............................ 502/104; 502/113; 502/118; 526/116; 526/904; 526/124.3
[58] Field of Search ............................ 502/104, 113, 502/118

[56] References Cited

U.S. PATENT DOCUMENTS

| | | | |
|---|---|---|---|
| 3,801,558 | 4/1974 | Fletcher et al. | 260/88.2 R |
| 3,878,124 | 4/1975 | Durand et al. | 526/144 |
| 4,004,071 | 1/1977 | Aishima et al. | 526/144 |
| 5,077,358 | 12/1991 | Durand et al. | 526/352 |

FOREIGN PATENT DOCUMENTS

| | | | |
|---|---|---|---|
| 1299862 | 12/1972 | United Kingdom | C08F 1/56 |
| WO 93/24542 | 12/1993 | WIPO | C08F 10/02 |

*Primary Examiner*—David W. Wu
*Attorney, Agent, or Firm*—Marianne H. Michel; W. Bradley Haymond

[57] ABSTRACT

Disclosed is a catalyst precursor, useful to make catalysts useful in the polymerization of olefins, comprising the product obtained by adding a preformed magnesium source to a solution comprising a solvent having dissolved therein a transition metal compound and an alkyl halide.

37 Claims, 2 Drawing Sheets

TRANSITION METAL-MAGNESIUM CATALYST PRECURSORS FOR THE POLYMERIZATION OF OLEFINS

This application is a continuation of application U.S. Ser. No. 08/358,444 filed Dec. 19, 1994 now abandoned which is a continuation-in-part of U.S. Ser. No. 08/164,501 filed on Mar. 10, 1994, now abandoned and of U.S. Ser. No. 08/259,823 filed on Jun. 15, 1994, each of which is a continuation-in-part of U.S. Ser. No. 07/896,271, filed Jun. 10, 1992 now abandoned.

FIELD OF THE INVENTION

This invention relates to a new transition metal-magnesium catalyst precursor used to prepare catalysts which are useful for the polymerization of olefins. More particularly, this invention relates to a new method for the preactivation of a transition metal catalyst wherein the catalyst precursor is preactivated by adding a preformed magnesium source or compound to a solution containing transition metal compound(s) and an alkyl halide. As used herein, the term "preactivation" means contacting the transition metal with a magnesium compound and one or more alkyl halide(s).

BACKGROUND OF THE INVENTION

It is known that olefins such as ethylene can be polymerized by means of a solid catalyst which comprises: a compound of a transition metal such as titanium in the trivalent or tetravalent state, and a co-catalyst comprising a reducing agent, such as an organo-metallic or, more specifically, an organo-aluminum compound.

Although these catalytic systems have an attractive degree of activity, when polymerization is concluded they generally result in the formation of polymers containing more than 100 parts per million by weight of transition metal. For most of the uses of such polymers, this makes it virtually essential to remove the catalytic residues by a special treatment.

It is also known that catalytic activity is substantially improved by complexing the transition metal with a support such as $MgCl_2$. See, for example, Barbé, P. C., Cecchin, G., Noristi, L., "The Catalytic System Ti-Complex/$MgCl_2$", Advances in Polymer Science (1987), 81, pp. 1–81. Typically, a quantity of $MgCl_2$ and one or more titanium procatalysts are mixed together in a nonpolar solvent to yield a material capable of polymerizing olefins in the presence of a cocatalyst such as an aluminum alkyl.

It is also known that it is possible to very substantially increase the catalytic activity of the aforementioned reduced transition metal compounds by means of a preactivation treatment. This treatment involves contacting the transition metal compound with magnesium and one or more alkyl halide(s). The reduced transition metal compounds which are preactivated by this treatment result in catalysts which make polymers having good physical characteristics and capable of being processed by injection molding or by extrusion. By virtue of the high degree of activity of the preactivated catalysts, removing the catalytic residues contained in the polymers becomes unnecessary.

U.S. Pat. No. 4,042,771, issued to Michel Avaro and Pierre Mangia on Aug. 16, 1977, discloses one type of preactivation treatment. In Avaro's treatment, the magnesium used was in the form of powder or turnings because it is said to be preferable to have the magnesium in a high state of purity. In order to facilitate preactivation of the solid transition metal compounds, the magnesium is used in a reactive form which is substantially devoid of impurities due in particular to oxidation of the metal. Avaro et al. state that, in practice, the magnesium in the industry is activated before being introduced into the medium in which preactivation is effected. According to Avaro et al., previous activation of the magnesium can, for example, comprise grinding the metal in an inert atmosphere or in an inert liquid such as an aliphatic solvent. This preliminary operation can also be effected by treating the magnesium with iodine. It is stated to be more convenient, however, to activate the magnesium within the medium in which preactivation is effected.

There are several problems with the procedure disclosed by Avaro et al. For one, the reaction depends on the magnesium source and its state of purity. Therefore, reproducibility of experimental results can be a problem. Also, when the procedure involves the added step of grinding the magnesium, additional equipment is required. Furthermore, when iodine is used to activate the magnesium, unreacted magnesium and iodine may contaminate any subsequent reactions. Lastly, catalysts prepared by Avaro et al.'s procedure produce unacceptable amounts of fine polyolefin particles, i.e., particles of polyolefin having a diameter of less than 180 microns. Consequently, an undesirable elutriation of the catalyst is required to remove fine catalyst particles before polymerization can occur in a commercial reactor.

Use of a preformed alkylmagnesium halide as a magnesium source in the preactivation treatment of olefin polymerization catalysts is also known in the art and solves some of the aforementioned problems. U.S. Pat. No. 4,355,143, issued to Lassalle on Oct. 19, 1982, discloses the use of organomagnesium halide in the preactivation treatment of catalysts used for the polymerization of olefins.

Lassalle discloses that the catalyst may be preactivated by reaction of one or more compounds of tetravalent titanium, and an organomagnesium halide compound having the formula $MgXR$ or the formula $MgR_2$ wherein X is a chlorine or bromine atom, and R is an alkyl radical which may contain from 2 to 8 carbon atoms.

Example C of Lassalle's patent discloses a procedure for preparing the catalyst. In that example, a preformed alkylmagnesium halide is first prepared by reacting powdered magnesium in a flask with an alkyl halide in heptane with an iodine crystal. A solution of titanium compounds is added to the resulting suspension of alkylmagnesium halide over a period of 2 hours, and the resulting product forms by precipitation.

It is advantageous to make a catalyst that minimizes the amount of fine particles of polyolefin that remain after polymerization. It is also advantageous to create a catalyst which can produce polyolefin having a higher melt index at lower concentrations of hydrogen. The present invention provides these advantages.

SUMMARY OF THE INVENTION

In accordance with the present invention, there is provided a catalyst precursor, useful to make catalysts useful in the polymerization of olefins, comprising magnesium and at least one Group IVB or Group VB transition metal, wherein said catalyst precursor is prepared by the process comprising:

(a) preparing a preformed magnesium source comprising a compound of the formula $$MgR_qX_{(2-q)}$$

where R is an alkyl group having from 1 to 8 carbon atoms, an alkenyl group having from 2 to 8 carbon atoms, or an aryl group having from 6 to 12 carbon atoms; X is halide; and q is a number from 0 to 2, inclusive; and (b) adding said preformed magnesium source to a solution comprising a solvent having dissolved therein:
(1) an alkyl halide; and
(2) at least one transition metal compound represented by the formula

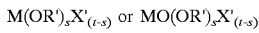

where M is at least one transition metal from Group IVB and Group VB of the Periodic Table of the Elements; R' is an alkyl group having from 1 to 8 carbon atoms, an alkenyl group having from 2 to 8 carbon atoms, or an aryl group having from 6 to 12 carbon atoms; X' is halide; t is 3 or 4; and s is an integer between 0 and 4, inclusive.

Also disclosed is a catalyst precursor as described above, with the limitation that when q is 1 and when M comprises titanium, s is at least one and (t-s) is at least one.

Also provided in accordance with the present invention is a method for the preparation of a catalyst precursor, useful to make catalysts useful in the polymerization of olefins, comprising adding a preformed magnesium source to a liquid solution comprising a solvent having dissolved therein:

(a) an alkyl halide; and
(b) at least one transition metal compound as defined in (b)(2) above.

Also disclosed is the above method of making a catalyst precursor, having the limitation that when q is 1 and when M consists essentially of titanium, s is at least one and (t-s) is at least one.

The present invention also provides a catalyst precursor, useful to make catalysts useful in the polymerization of olefins, comprising the product obtained by reacting a preformed magnesium source with a solution comprising a solvent having dissolved therein (a) a transition metal compound; and (b) an alkyl halide, said catalyst precursor being comprised of hollow and approximately spheroidal particles.

Also provided in accordance with the present invention is a polymerization catalyst, useful for the polymerization of olefins, prepared by a process comprising adding an organoaluminum compound, preferably tri-n-octyl-aluminum or triethylaluminum, to the product obtained by adding a preformed magnesium source to a solution comprising a solvent having dissolved therein:

(a) an alkyl halide; and
(b) at least one transition metal compound as defined above.

Also provided in accordance with the present invention is an improved process for the polymerization of olefins in the presence of a polymerization catalyst, wherein the improvement comprises employing a catalyst made from a catalyst precursor comprising the product obtained by adding a preformed magnesium compound to a liquid solution comprising a solvent having dissolved therein:

(a) an alkyl halide; and
(b) at least one transition metal compound as defined above.

Also provided in accordance with the present invention is an improved process for the polymerization of olefins in the presence of a polymerization catalyst, wherein the improvement comprises employing a catalyst made from a catalyst precursor comprising the product obtained by reacting a preformed magnesium compound and a liquid solution comprising a solvent having dissolved therein:

(a) an alkyl halide; and
(b) at least one transition metal compound as defined above;

wherein said catalyst is comprised of hollow particles.

Also provided in accordance with the present invention is a prepolymer, useful for the polymerization of olefins, obtained by the process comprising:

(1) reacting a catalyst precursor formed by adding a preformed magnesium compound to a solution comprising a solvent having dissolved therein:
(a) an alkyl halide; and
(b) at least one transition metal compound as defined above; with
(2) an activator, such as triethylaluminum or tri-n-octylaluminum; and
(3) contacting the product of step (2) with a sufficient amount of olefin (preferably ethylene), under olefin polymerization conditions, such that the product obtained has a melt index in the range of about 0.1 to about 5.

In one embodiment, the present invention involves a process for the polymerization of olefins, the process comprising:

(a) making a preformed magnesium compound in a solvent;
(b) making a solution comprising a solvent having dissolved therein at least one transition metal compound as described above and an alkyl halide;
(c) adding the product of step (a) to the solution of step (b);
(d) adding trialkylaluminum to the product obtained from step (c);
(e) reacting the product of step (d) with a sufficient amount of olefin, under olefin polymerization conditions, such that the product formed has a melt index in the range of about 0.1 to about 5;
(f) reacting the product of step (e) with sufficient olefin, under olefin polymerization conditions, to produce polyolefin resin.

Among other factors, the present invention is based on the discovery that a better catalyst is made by reversing the traditional order of addition of reactants in a transition metal-magnesium catalyst precursor synthesis. More particularly, the present invention is based on the discovery that the catalyst precursor made by adding a preformed magnesium compound to a solution comprising a solvent having dissolved therein:

(a) an alkyl halide; and
(b) at least one transition metal compound as defined above produces olefin polymerization catalysts which are surprisingly more advantageous than catalysts obtained from catalyst precursors made by adding the solution of transition metal compounds to the preformed magnesium compound. Some of the advantages of the present invention over the prior art are: the surprisingly high hydrogen response of the catalyst, production of fewer fine particles at the synthesis stage using raw catalyst and prepolymers, the catalysts' unique morphology, which is different from prior catalysts in that the present invention's catalysts are comprised of hollow particles, and the ability of catalyst of this invention to incorporate more comonomer than similar prior-art catalyst.

DETAILED DESCRIPTION OF THE INVENTION

Figure 1:
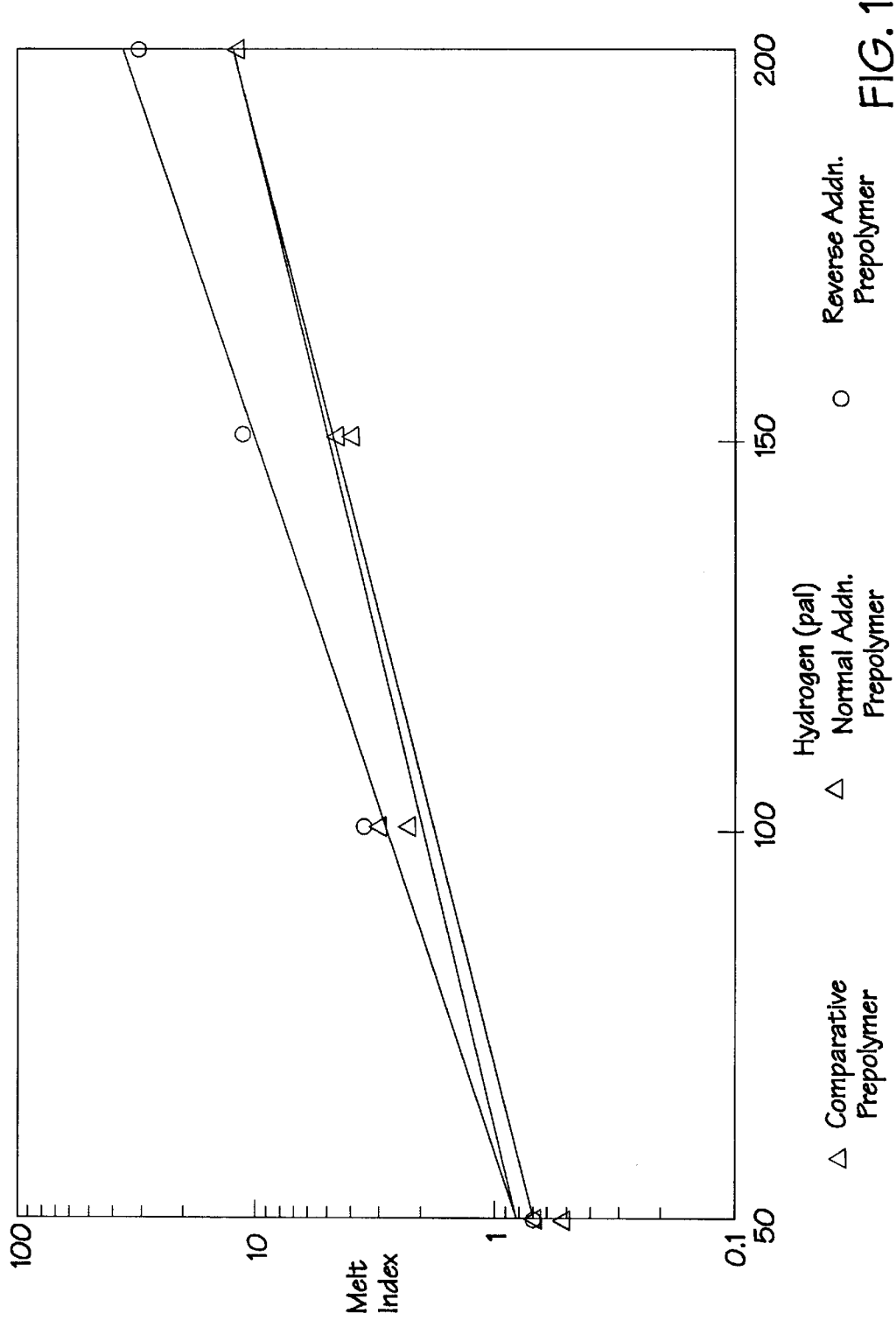
FIG. 1 is a graph depicting melt index of polymers made in accordance with the present invention as a function of hydrogen pressure.

For the sake of brevity, the terms "normal addition" and "reverse addition" will be used herein to describe the prior art method and the method of the present invention for making transition metal-magnesium olefin polymerization catalyst precursors. In the prior art method, the "normal addition", a solution of transition metal compound(s) and alkyl halide is added to a magnesium compound(s). In the method of the present invention, the "reverse addition", preformed magnesium compound(s) is added to a solution of transition metal compound(s) and alkyl halide.

Also, as used herein, the term "catalyst precursor" refers to the transition metal-magnesium product obtained by reacting a transition metal compound(s), a magnesium source, and alkyl halide. The catalyst precursor is not an olefin polymerization catalyst, but can be activated to become one.

In one aspect, the present invention is a process for the polymerization of olefins, preferably alpha-olefins, more preferably ethylene. The process includes the polymerization of one or more olefins having the formula CHA=CHA' wherein A and A' are each independently hydrogen or an alkyl radical containing from 1 to 8 carbon atoms. Preferred olefins are alpha-olefins wherein at least one of A or A' is hydrogen.

The olefins are contacted with a polymerization catalyst. The polymerization catalyst comprises a catalyst precursor that has been activated by an activator molecule. The catalyst precursor of the present invention comprises the product obtained by:

(a) adding a preformed magnesium source comprising a compound of the formula $$MgR_qX_{(2-q)}$$

where R is an alkyl group having from 1 to 8 carbon atoms, an alkenyl group having from 2 to 8 carbon atoms, or an aryl group having from 6 to 12 carbon atoms; X is halide; and q is a number from 0 to 2, inclusive; to (b) a solution comprising a solvent having dissolved therein:
(1) an alkyl halide; and
(2) at least one transition metal compound represented by the formula $$M(OR')_sX'_{(t-s)} \text{ or } MO(OR')_sX'_{(t-s)}$$

where M is at least one transition metal from Group IVB and Group VB of the Periodic Table of the Elements; R' is an alkyl group having from 1 to 8 carbon atoms, an alkenyl group having from 2 to 8 carbon atoms, or an aryl group having from 6 to 12 carbon atoms; X' is halide; t is 3 or 4; and s is an integer between 0 and 4, inclusive.

In one embodiment of this invention, the catalyst precursor comprises the precursor described above, with the proviso that when q is 1 and when M consists essentially of titanium, s is at least one and (t-s) is at least one.

Once formed, the catalyst precursor is activated with an activator compound. Typically, the activator is an organometallic compound or compounds of a metal of Groups II or III of the Periodic Table of elements. Preferably, the activator is an organoaluminum compound, more preferably an alkylaluminum compound. Examples of activators include, but are not limited to, trialkylaluminum compounds such as triethylaluminum, tri-n-octylaluminum and the like. The activator compound may be used in neat form, or it may be supported on a carrier. If a carrier is employed, it may be an inert, organic or inorganic, carrier.

The catalyst precursor may be activated prior to introduction into the polymerization reactor, or the catalyst precursor and activator compound may be added to the polymerization reactor separately. Preferably, enough activator is present to make a prepolymer having a bulk density of about 0.28–0.32. This typically requires a mole ratio of activator metal to transition metal present in the catalyst of greater than about 0.5.

The olefin polymerization catalyst is contacted with an olefin, under polymerization conditions, to produce a prepolymer. A sufficient amount of olefin is used such that the prepolymer obtained has a melt index in the range of about 0.1 to about 5. (As used herein, the term "melt index" refers to the unit of measure described in ASTM Procedure No. D-1238, which is incorporated by reference herein.) The prepolymer is then used as a catalyst for the polymerization of the olefin. Polymerization is accomplished by adding more olefin to the prepolymer under polymerization conditions.

I. THE CATALYST PRECURSOR

The catalyst precursors of the present invention are prepared by adding a preformed magnesium source or compound to a solution containing transition metal compound(s) and an alkyl halide. The magnesium source can be represented by the formula $MgR_qX_{(2-q)}$. R is an alkyl radical, preferably $C_2$ to $C_8$, more preferably butyl; an alkenyl radical, preferably $C_2$ to $C_8$, more preferably butenyl; and/or an aryl radical, preferably $C_6$ to $C_{12}$, more preferably phenyl. The radicals are preferably nonfunctionalized. X is a halide, preferably chloride or bromide, and q is a number between 0 and 2, inclusive. Preferably, q is between 0.1 and 1.9, inclusive, and most preferably, q is about 1. The magnesium source may be added to the transition metal solution in solid powdered form or as a solid suspended in an organic liquid such as hexane or heptane.

Methods of making the magnesium source are known in the art. U.S. Pat. No. 3,878,124 to Durand et al., which is incorporated by reference herein in its entirety, discloses such methods.

The preformed magnesium source is slowly added as a solid or slurry to a solution comprising a solvent having dissolved therein:
(1) an alkyl halide; and
(2) at least one transition metal compound represented by the formula $$M(OR')_sX'_{(t-s)} \text{ or } MO(OR')_sX'_{(t-s)}$$

where M is at least one transition metal from Group IVB and Group VB of the Periodic Table of the Elements; R' is an alkyl group having from 1 to 8 carbon atoms, an alkenyl group having from 2 to 8 carbon atoms, or an aryl group having from 6 to 12 carbon atoms; X' is halide; t is 3 or 4; and s is an integer between 0 and 4, inclusive.

In one embodiment, the transition metal compound used is as described above, with the proviso that when q is 1 and when M comprises titanium, s is at least one and (t-s) is at least one.

M is preferably vanadium, titanium, or a blend of vanadium and titanium. The vanadium compounds may be tetravalent or pentavalent. The vanadium compounds are preferably vanadium halides such as vanadium tetrabromide and, more preferably, vanadium tetrachloride. The vanadium compounds are also preferably vanadium oxyhalides, with vanadium oxytrichloride being preferred. In addition, vanadium tetraalkoxide compounds are preferred, including vanadium tetra-n-butoxide.

The titanium compounds may contain trivalent or preferably tetravalent titanium, having the formula $TiX'_n$ or $Ti(OR')_m$, wherein n and m each is 3 or 4, preferably 4, and X and R' are as defined above. The titanium compounds are preferably alkoxytitanium halides, such as titanium tri-n-propoxychloride. When titanium compounds are used with other transition metals such as vanadium, the titanium compounds are preferably alkoxytitanium halides as above, titanium halides, titanium alkoxides, or a mixture of these compounds. The preferred titanium halide is titanium tetrachloride, and the preferred titanium alkoxide is titanium tetraisopropoxide or titanium tetra-n-propoxide. The mole ratio of magnesium to transition metal should preferably be in the range of about 2:1 to about 10:1, and more preferably is about 4:1 to about 5:1.

The alkyl halide is defined by the formula R"X wherein R" is an alkyl radical, preferably $C_2$ to $C_8$ alkyl, more preferably butyl or propyl, and X is as defined above.

The transition metal compound(s) is dissolved in an appropriate amount of solvent together with an alkyl halide such that the molar ratios are:

(a) transition metal compound to alkyl halide is about 0.01:1 to about 0.20:1, preferably about 0.05:1 to about 0.10:1; and (b) magnesium to alkyl halide is about 1:1, preferably about 0.8:1 to about 1:1.

The amount of solvent to transition metal solution should be a volume ratio of about 20–50:1, preferably about 30–35:1. The solvent may be any liquid which dissolves the transition metal compound(s) and alkyl halide, and does not interfere with the reaction which produces the catalyst precursor. The solvent will typically be an organic solvent, preferably a hydrocarbon solvent. Examples of suitable solvents include, but are not limited to, $C_5$ to $C_{10}$ hydrocarbons. Hexane and heptane are preferred solvents.

The catalyst precursors of this invention may be produced by reaction at a temperature of from about 60° to about 90° C., preferably from about 75° to about 85° C. The liquid solution containing the transition metal compound(s) and alkyl halide is heated to about 80–85° C. A preformed magnesium source is then added to the liquid solution by a controlled addition, i.e., the magnesium source is added to the transition metal solution slowly over time. Once all of the magnesium source has been added to the liquid solution, the resulting mixture is cooled to room temperature and filtered to recover the catalyst precursor in the form of a powder.

It is critical to the present invention that the preformed magnesium source be slowly added to the solution of transition metal compound(s) and alkyl halide by a controlled addition over a relatively long period of time. While the period of time over which the magnesium source is added to the solution will depend on such factors as the size of the reaction mixture, typically that period of time will be about 1 to about 5 hours, preferably about 2 to about 4 hours. This manner and order of addition is necessary to allow small concentrations of preformed magnesium source to react with excess transition metal in the beginning of the reaction.

A catalyst precursor which is synthesized by the reverse addition method of this invention will contain particles having a unique morphology, i.e., the catalyst precursor will contain hollow particles. These hollow particles are different from the solid, compact particles obtained by the normal addition process. This difference may be observed using a scanning electron microscope such as a JEOL JSM-820 instrument equipped with a Tracor Northern 5500 Energy dispersive X-ray detector.

In addition, a catalyst or prepolymer which is synthesized by using precursors made by the reverse addition method of this invention will contain substantially less fines than prior-art catalysts or prepolymers made using the normal addition method. Prior-art normal addition titanium magnesium catalyst products and prepolymer products made using them have contained a significant amount of fine particles. Fine particles are particles of less than 20 microns in diameter for catalyst, less than 80 microns in diameter for prepolymer, and less than 180 microns in diameter for polymer. Catalyst particle sizes may be determined by using a Malvern 2600 Particle Size Analyzer or by standard sieving techniques, and prepolymer and polymer particle sizes can be determined by the method of ASTM procedure D1921, which is incorporated by reference in its entirety herein. Fine particles are especially disadvantageous in gas phase olefin polymerization reactions. The fine particles are easily carried beyond the disengaging zone of the reactor bed and into areas of the reactor where polymerization is not intended to occur. In addition, fine particles may electrostatically affix to metal surfaces such as the reactor wall, yielding growing sheets of active polymer which can break away from the wall and at least partially plug the gas inlet. To avoid these problems, the fine particles must be removed prior to polymerization. This is typically done via a catalyst elutriation procedure, like the one described in U.S. Pat. No. 4,931,193, which is incorporated herein by reference. This procedure involves first having to prepare a homogeneous suspension of the particles in an elutriation liquid, then elutriating the catalyst by filtering the suspension through one or two elutriation columns.

Because the present invention provides catalysts and prepolymers with fewer fine particles, the aforementioned elutriation procedure can be avoided. This simplifies the catalyst preparation by eliminating one preparative step while also significantly improving the catalyst yield.

Table I below illustrates the above mentioned advantages.

TABLE I

| | % Fines In Raw Catalyst % <20 microns) | % Fines In Prepolymer (% <80 microns) | Melt Index of polyethylene product [H2] = 150 psig | Morphology of Catalyst |
|---|---|---|---|---|
| COMPARATIVE EXAMPLE A | 17.5 | 2* | 4.9 | Solid & Compact |
| COMPARATIVE EXAMPLE B | 3 | 8 | 4.8 | Solid & Compact |
| EXAMPLE 1 | 4 | 2.3 | 12 | Hollow |

* catalyst was elutriated in prior step.

II. OLEFIN POLYMERIZATION CATALYST

The catalyst precursor becomes the polymerization catalyst upon activation. The catalyst precursor is activated by contacting it with an activator compound such as an organoaluminum compound, as discussed above. Preferred activators are trialkylaluminum compounds, especially triethylaluminum, tributylaluminum and tri-n-octylaluminum. The aluminum to transition metal mole ratio is about 0.50:1 to about 2.0:1, preferably about 0.8:1 to about 1.2:1. The catalyst precursor is activated by the activator compound by methods conventional in the art.

III. PREPOLYMERIZATION AND POLYMERIZATION

Prepolymerization is generally carried out under a pressure of less than about 70 psi and at a temperature from about 40° to about 150° C. This operation may be performed by introducing the monomer(s) comprising, e.g., ethylene (and possibly other olefins), into a liquid diluent such as a saturated aliphatic hydrocarbon or, in the absence of diluent, by direct contact between the monomer(s) in the gaseous condition and the constituents of the catalyst system. Prepolymerization is carried out in the presence of a chain growth limiter, generally comprising hydrogen, whose proportion by volume with respect to the monomer(s) introduced into the polymerization medium is from about 1 to about 80%, so as to produce a polymer having the desired melt index.

The catalyst may be introduced into the polymerization reactor directly or in the form of a prepolymer produced by preliminary polymerization of one or more olefins within an inert liquid such as an aliphatic hydrocarbon and in the presence of a catalyst of the present invention. Typically, the prepolymer contains about 1000 parts by weight of olefin per part by weight of transition metal. It may or may not be filtered prior to polymerization. The prepolymer has a melt index in the range of about 0.1 to about 5.

The catalyst may be used in any polymerization method known in the art. The catalyst is particularly effective in the "low pressure" polymerization of olefins, although the catalyst may also be used in gas phase, in slurry phase, or in "high pressure" polymerization. The temperature in a "low pressure" polymerization is typically maintained between 40 and 150° C., and preferably is between 70 and 110° C. The pressure is typically maintained between 100 and 1000 psi, and preferably is between 250 and 500 psi. Hydrogen may be used to control the molecular weight of the polymer.

Having described the basic concepts of the invention, reference is now made to the following Examples which are given by way of illustration, and not of limitation, of the practice of the present invention in the preparation of the catalyst precursor and catalyst, and the use of the catalyst in the polymerization of olefins.

EXAMPLE 1

Preparation of Organomagnesium Support Precursor

An oven dried 1000 mL flask containing 10.0 g (0.411 mol) of magnesium powder was equipped with a condenser and evacuated overnight. 500 mL heptane and 0.10 g (0.4 mmol) iodine was added to the flask under argon. After the addition of 50 mL (0.479 mol) n-butylchloride, the mixture was heated to reflux for four hours, filtered, washed with heptane, and isolated as an off-white pyrophoric powder. Elemental analysis indicated a mixture of products having the following overall percentages of elements (elemental composition): Mg 24.5%; Cl 47.3%; C 18.2%; and H 3.4%. Magnesium content was determined using a Perkin-Elmer Plasma II Emission Spectrometer, an inductively-coupled plasma instrument. Carbon and hydrogen content were determined using a Perkin-Elmer 240 Combustion Analyzer, and chloride content was analyzed by potentiometric titration using a Fisher Computer-Aided Titrimeter.

EXAMPLE 2

Preparing a Vanadium Reverse Addition Catalyst Precursor

A total of 300 mL heptane, 3.0 mL (28 mmol) $VCl_4$, and 21 mL (201 mmol) n-butylchloride is added to a 1000 mL flask and heated to 85° C. Organomagnesium support precursor from Example 1 (15.7 g) is added via a powder addition funnel over 1.5 hours. The slurry is maintained at 85° C. for an additional 0.5 hour, washed with 3×100 mL aliquots of heptane, and dried.

EXAMPLE 3

Preparing a Vanadium Reverse Addition Catalyst Precursor

A total of 300 mL heptane, 2.6 mL (28 mmol) $VOCl_3$, and 21 mL (201 mmol) n-butylchloride is added to a 1000 mL flask and heated to 85° C. Organomagnesium support precursor from Example 1 (15.7 g) is added via a powder addition funnel over 1.5 hours. The slurry is maintained at 85° C. for an additional 0.5 hour, washed with 3×100 mL aliquots of heptane, and dried.

EXAMPLE 4

Preparing a Vanadium Reverse Addition Catalyst Precursor

A total of 300 mL heptane, 9.6 g (28 mmol) $V(O-CH_2CH_2CH_2CH_3)_4$, and 21 mL (201 mmol) n-butylchloride is added to a 1000 mL flask and heated to 85° C. Organomagnesium support precursor from Example 1 (15.7 g) is added via a powder addition funnel over 1.5 hours. The slurry is maintained at 85° C. for an additional 0.5 hour, washed with 3×100 mL aliquots of heptane, and dried.

EXAMPLE 5

Preparing a Vanadium Reverse Addition Catalyst Precursor

A total of 300 mL heptane, 4.8 g (14 mmol) $V(O-CH_2CH_2CH_2CH_3)_4$, 2.7 g (14 mmol) $VCl_4$, and 21 mL (204 mmol) n-butylchloride is added to a 1000 mL flask and heated to 85° C. Organomagnesium support precursor from Example 1 (15.7 g) is added via a powder addition funnel over 1.5 hours. The slurry is maintained at 85° C. for an additional 0.5 hour, washed with 3×100 mL aliquots of heptane, and dried.

EXAMPLE 6

Preparing a Titanium/Vanadium Reverse Addition Catalyst Precursor

A total of 300 mL heptane, 3.1 mL (28 mmol) $TiCl_4$, 0.1 mL (1 mmol) $VCl_4$, and 21 mL (201 mmol) n-butylchloride is added to a 1000 mL flask and heated to 85° C. Organomagnesium support precursor from Example 1 (15.7 g) is added via a powder addition funnel over 1.5 hours. The slurry is maintained at 85° C. for an additional 0.5 hour, washed with 3×100 mL aliquots of heptane, and dried.

EXAMPLE 7

Preparing a Titanium/Vanadium Reverse Addition Catalyst Precursor

A total of 300 mL heptane, 1.8 mL (16 mmol) $TiCl_4$, 3.4 mL (12 mmol) $Ti(O—CH_2CH_2CH_3)_4$, 0.3 mL (3 mmol) $VOCl_3$, and 21 mL (201 mmol) n-butylchloride is added to a 1000 mL flask and heated to 85° C. Organomagnesium support precursor from Example 1 (15.7 g) is added via a powder addition funnel over 1.5 hours. The slurry is maintained at 85° C. for an additional 0.5 hour, washed with 3×100 mL aliquots of heptane, and dried.

EXAMPLE 8

Preparing a Titanium/Vanadium Reverse Addition Catalyst Precursor

A total of 300 mL heptane, 2.2 mL (20 mmol) $TiCl_4$, 0.7 g (2 mmol) $V(O—CH_2CH_2CH_2CH_3)_4$, 0.35 g (2 mmol) $VOCl_3$, and 21 mL (201 mmol) n-butylchloride is added to a 1000 mL flask and heated to 85° C. Organomagnesium support precursor from Example 1 (15.7 g) is added via a powder addition funnel over 1.5 hours. The slurry is maintained at 85° C. for an additional 0.5 hour, washed with 3×100 mL aliquots of heptane, and dried.

EXAMPLE 9

Preparing a Titanium/Vanadium Reverse Addition Catalyst Precursor

A total of 300 mL heptane, 1.0 g (3 mmol) $V(O—CH_2CH_2CH_2CH_3)_4$, 8.5 g (25 mmol) $Ti(O—CH_2CH_2CH_2CH_3)_4$, and 21 mL (201 mmol) n-butylchloride is added to a 1000 mL flask and heated to 85° C. Organomagnesium support precursor from Example 1 (15.7 g) is added via a powder addition funnel over 1.5 hours. The slurry is maintained at 85° C. for an additional 0.5 hour, washed with 3×100 mL aliquots of heptane, and dried.

EXAMPLE 10

Preparing a Titanium/Vanadium Reverse Addition Catalyst Precursor

A total of 300 mL heptane, 2.6 mL (24 mmol) $TiCl_4$, 0.2 mL (2 mmol) $VCl_4$, 0.2 mL (2 mmol) $VOCl_3$, and 21 mL (201 mmol) n-butylchloride is added to a 1000 mL flask and heated to 85° C. Organomagnesium support precursor from Example 1 (15.7 g) is added via a powder addition funnel over 1.5 hours. The slurry is maintained at 85° C. for an additional 0.5 hour, washed with 3×100 mL aliquots of heptane, and dried.

COMPARATIVE EXAMPLE A

Preparing Catalyst Precursor Using Magnesium Powder

The procedure followed, for the preparation of the catalyst and polymerization of the olefin, was substantially the same procedure as described in EXAMPLE A of U.S. Pat. No. 4,355,143 issued to Lassalle, except that titanium tetraisopropoxide was used in equal amounts with titanium tetrachloride.

COMPARATIVE EXAMPLE B

Preparing Normal Addition Catalyst Precursor

The procedure followed, for the preparation of the catalyst, was substantially the same procedure as that described in EXAMPLE C of U.S. Pat. No. 4,355,143, except that titanium tetraisopropoxide was used in equal amounts with titanium tetrachloride.

EXAMPLE 11

Preparing Reverse Addition Catalyst Precursor

A 500 mL three neck flask topped with a reflux condenser, powder addition funnel, and rubber septum was attached to a Schlenk line. This apparatus was charged with 200 mL heptane, 3.6 mL (12 mmol) titanium tetraisopropoxide, 1.8 mL (16 mmol) titanium tetrachloride, 21 mL (200 mmol) butylchloride, and a Teflon stir bar under argon. The mixture was heated to 85° C. and 15.7 g (134 mmol) butylmagnesium chloride was evenly added to the mixture via the powder addition funnel over 1.5 hrs. The resulting brown slurry was heated an additional 0.5 hr. at 85° C. The mixture was cooled to room temperature and Schlenk filtered to give 15.6 g of a tan-brown, free-flowing powder having the following elemental analysis: Mg 13.1%; Cl 51.1%; C 17.8%; H 3.4%; Ti 6.3%.

Figure 2:
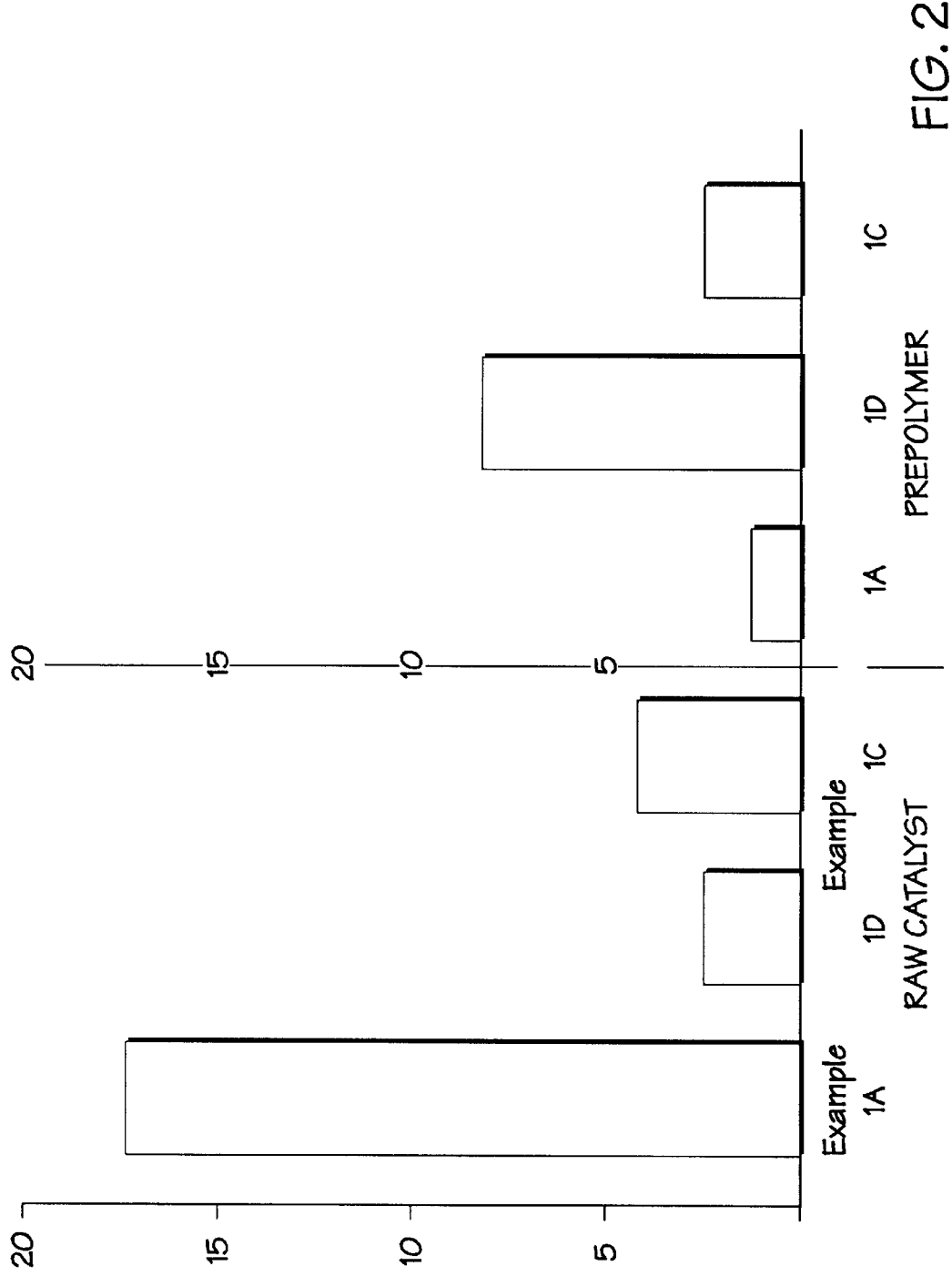
FIG. 2 is a bar graph showing the effect of catalyst type on the production of polyethylene fine particles.

FIG. 2 is a bar graph depiction of-the percentage of fine particles of polyethylene produced using catalysts made from the magnesium powder catalyst precursor of Comparative Example A, the normal addition catalyst precursor of Comparative Example B, and the reverse addition catalyst precursor of Example 11 wherein the catalysts used were in raw form and in prepolymer form. As used herein, a catalyst used in raw form is one which does not go through a prepolymerization stage.

The graph shows that normal addition catalyst and reverse addition catalyst produce about the same percentage of fine particles in the raw form. However, when using the catalysts in prepolymer form, the reverse addition catalyst produces significantly less fine particles. The graph also shows that powdered magnesium catalysts have the lowest production of fine particles. However, prior to forming the prepolymer, Comparative Example A catalyst was elutriated to remove fine particles. The elutriation procedure is undesirable because it reduces catalyst yield and increases the equipment and time required to process the catalyst, thereby increasing operating costs.

EXAMPLE 12

General Laboratory Procedure for Prepolymerization for Catalyst Precursor of Examples 2–11 and Comparative Examples A and B An 810 mL Fisher-Porter bottle is charged with 350 mg of the polymerization catalyst precursor, 50 mL heptane, alkylaluminum compound, and a Teflon stir bar. The bottle is connected to an ethylene cylinder, and the assembly is evacuated. Dihydrogen is added as required. The bottle is pressurized as required with ethylene and heated to 80° C. As ethylene is consumed, the pressure falls, and the bottle is repressurized to original pressure after the gauge pressure has fallen 10 psig. A total of 300 psi of ethylene is added in this way. The catalyst gradually turns white-grey during the course of this one to two hour process. The pressure is vented, and the solid product is dried in vacuo to leave prepolymer as an off-white product.

EXAMPLE 13

General Polymerization Procedure for Examples 2–12 and Comparative Examples A and B A two-liter autoclave equipped with an anchor-helix stirrer is purged of any oxygen or moisture by evacuation at 80°

C. followed by several pressure/evacuate cycles with argon. The vessel is charged with a slurry of catalyst precursor or prepolymer, alkylaluminum compound, and 50 mL heptane. Argon and hydrogen are added to bring the pressure to 350 psig. Ethylene is added to bring the total pressure to 550 psig. Temperature and stirring rate are maintained and ethylene is metered from a reservoir to determine a kinetic profile of the catalyst. After the appropriate time, the gasses are vented and the reactor cooled to leave polyethylene as a white powder.

FIG. 1 shows the hydrogen response for the catalyst of this invention and comparative catalysts. As can be seen, the catalyst of the present invention gives higher melt index polymers at any given hydrogen concentration. For example, at 150 psi, the melt index is about 10 when the catalyst of this invention is used, while the melt index is only about 4 for the comparative example. Similarly, at 200 psi of hydrogen, the melt index is about 35 when the catalyst of this invention is used, compared to about 12 for the comparative catalyst.

The catalyst of this invention has a surprisingly high hydrogen response, that is, relatively small amounts of hydrogen can be used to alter the polymer molecular weight. This high hydrogen response is advantageous, as it is often desirable to adjust polymer molecular weight during a polymerization run depending on the melt index of the polyolefin product desired and its planned applications or uses.

The high hydrogen response of the catalyst of this invention also means that less hydrogen is used. As it is difficult to remove catalyst poisons from hydrogen, less hydrogen means fewer introduced catalyst poisons. Also, there are operating pressure limits on most ethylene polymerization vessels; these limit the amount of hydrogen that can be added. Moreover, added hydrogen generally displaces ethylene in the polymerization vessel and, thus, decreases the ethylene concentration in the vessel. This can impact the reaction kinetics.

EXAMPLE 14

Preparation of Magnesium Chloride Precursor 10 g of finely divided Mg powder (411 mmol) was added to a 1000 mL flask equipped with a condenser. After 3 evacuation/argon refill cycles, 350 mL heptane, 0.1 g (0.4 mmol) iodine and 50 ml (479 mmol) n-butylchloride were added and heated to reflux for 4 hours. The product was washed with 3×100 mL aliquots heptane and dried in vacuo, yielding a gray/white powder. The total yield was 39 g with an elemental composition of 24.5% Mg, 47.3% Cl, 18.2% C and 3.4% H.

EXAMPLE 15

Preparing a Ti Reverse Addition Catalyst Precursor

A 1000 mL flask was charged with 300 mL dry heptane, 3.4 mL (12 mmol) Ti(O—n—$CH_2CH_2CH_3$)$_4$, 1.8 mL (16 mmol) $TiCl_4$, and 21 mL (201 mmol) n-butylchloride and heated to 85° C. A total of 15.7 g of dry product from Ex. 14 was then added over 2 hours via a powder addition funnel, followed by an additional hour of heating. The resulting brown slurry was washed with 3×100 mL heptane and dried in vacuo, yielding 21.8 g of product. The resulting elemental analysis showed 17.2% Mg and 7.0% Ti.

EXAMPLE 16

Preparing a Vanadium Reverse Addition Catalyst Precursor 300 mL dry heptane, 2.6 mL (28 mmol) $VOCl_3$, and 17.4 mL (167 mmol) n-butylchloride were added to a 1000 mL flask under argon and heated to 85° C. A total of 13 g of dry product from Ex. 14 was then added over 2 hours via a powder addition funnel, followed by an additional hour of heating. The resulting brown slurry was washed with 3×100 mL heptane and dried in vacuo, yielding 15.59 g of product. The resulting elemental analysis showed 15.4% Mg and 6.2% V.

EXAMPLE 17

Preparing a Vanadium and Titanium Reverse Addition Catalyst Precursor 300 mL dry heptane, 1.3 mL (13.8 mmol) $VOCl_3$, 1.5 mL (13.6 mmol) $TiCl_4$, and 21 mL (201 mmol) n-butylchloride were added to a 1000 mL flask under argon and heated to 85° C. A total of 15.7 g of dry product from Ex. 14 was then added over 2 hours via a powder addition funnel, followed by an additional hour of heating. The resulting slurry was washed with 3×100 mL heptane and dried in vacuo, yielding 15.59 g of product. The resulting elemental analysis showed 13.2% Mg, 3.7% V, and 2.6% Ti.

COMPARATIVE EXAMPLE C

A catalyst was prepared essentially by the method of U.S. Pat. No. 3,878,124 Ex. 4 (Durand et al.). Over the course of two hours, a 15.7 g aliquot of magnesium chloride precursor prepared in Example 14 above was stirred into a solution of 300 mL heptane, 27 mmol (3 mL) $TiCl_4$ and 201 mmol (21 mL) n-butylchloride maintained at 85° C. The brownish slurry was maintained at 85° C. for an additional hour, then was cooled to room temperature, filtered, and washed with 2×35 mL aliquots of heptane to yield 19.98 g of a free-flowing brown powder. Elemental analysis yielded the following results: Mg: 18.6%, Ti: 4.7%.

EXAMPLE 18

Prepolymerization of Catalyst Precursor of Examples 15–17 and Comparative Example C A 355 mL Fisher-Porter bottle was charged with 175 mL dry heptane, 350 mg of a catalyst precursor from Examples 15–17 or Comparative Example C, an amount of 25% tri-n-octylaluminum in heptane, and a teflon stir-bar. The bottle was purged with argon and heated to 62° C. while stirring the bottle contents. A total of 5 psig $H_2$ and enough ethylene to yield a total bottle pressure of 30 psig were then added to the reactor with stirring, initiating polymerization, and the temperature was permitted to rise to 68° C., at which temperature the reactor was maintained until polymerization was completed. The reactor pressure was maintained at 30 psig by introducing ethylene on demand until a total of 15.5 standard liters of ethylene was consumed. The resulting prepolymer was then isolated by evacuating the product to dryness.

EXAMPLE 19

Polymerization of Prepolymer of Example 18

A catalyst addition funnel was charged with the amount of 1% tri-n-octylaluminum ("TNOA") listed in Table II, enough heptane to yield a total volume of 75 mL, and 350 mg of selected prepolymer of Example 18. optionally, the amount of 1-hexene comonomer listed in Table II was also added to the funnel. The funnel was emptied into an evacuated 2 L Autoclave Engineers reactor maintained at a temperature of 80° C., and the stirrer was turned on. Argon was added to a pressure of about 125 psig, and hydrogen was added to a pressure of 150 psig. Ethylene was added until the pressure in the reactor was 300 psi and was allowed to polymerize for 1 hour. Polymer properties are summarized in Table II.

TABLE II

| CATALYST PRECURSOR | POLYMER PROPERTIES | | | PREPOLYMER PROPERTIES | | | |
|---|---|---|---|---|---|---|---|
| | EX. 15 | EX. 16 | EX. 17 | COMP. EX. C | COMP. EX. C | EX. 15 | EX. 15 |
| mL 25% TNOA added during prepolymerization | 0.5 | 0.5 | 0.5 | 0.6 | 0.6 | 1.17 | 1.17 |
| mL TNOA added during polymerization | — | — | — | 6.6 | 6.6 | 11.7 | 11.7 |
| mL 1-hexene added | — | — | — | 50 | 50 | 50 | 50 |
| Activity (kg polymer/mmol transition metal-hr) | 52.7[1] | 26.7[1] | 43.2[1] | 3.42 | 3.14 | 2.28 | 3.25 |
| Mw[2] | 93,410[1] | 134,300[1] | 163,800[1] | 123,900 | 110,000 | 108,200 | 115,600 |
| Mn[2] | 16,640[1] | 5,731[1] | 8,463[1] | 31,230 | 29,820 | 20,150 | 23,250 |
| Mz[2] | 418,100[1] | 515,100[1] | 616,000[1] | 375,800 | 306,600 | 372,600 | 389,500 |
| MWD | 5.61[1] | 23.43[1] | 19.35[1] | 3.97 | 3.69 | 5.37 | 4.97 |
| SCB/1000 C atoms[3] | — | — | — | 26.19 | 27.23 | 42.58 | 44.69 |

[1]indicates properties of prepolymer
[2]Mn, Mw and Mz were determined by gel permeation chromatography
[3]"SCB/1000 C atoms" = short-chain branching per 1000 carbon atoms, as determined by $^{13}$C NMR The reverse addition catalyst of Example 15 surprisingly incorporated more comonomer than the catalyst of Comparative Example C. As shown in Table II above, where 1-hexene and ethylene were both fed to the polymerization reactor, prior art catalyst produced a copolymer having only about 26–27 short-chain side-branches per 1000 carbon atoms, as measured by NMR. Reverse addition catalyst produced a copolymer having about 42–45 short-chain side-branches per 1000 carbon atoms, a substantial increase in the number of side-branches present in the copolymer. Since the number of short-chain side-branches is related to the amount of comonomer incorporated, this data indicated that approximately 60% more comonomer was incorporated into the copolymer when using the reverse addition catalyst of this invention in place of a prior art catalyst.

Samples of catalyst precursor from Example 11 and from Comparative Ex. C were also examined via scanning electron microscopy. Catalyst precursor of Comparative Ex. C exhibited a wide range of sizes and shapes, with the precursor appearing to be relatively amorphous honeycombed particles. Catalyst precursor of Example 11 clearly differed in morphology, having a relatively narrow particle-size distribution of well-defined hollow spherical particles having a diameter of approximately 50–80 microns. Prepolymer produced from these well-defined hollow spheres exhibited excellent bulk density (0.28–0.32), and the resulting polymer has been observed to be filled (i.e. not hollow) spheres, suggesting that polymerization occurred on both the inner and outer surfaces of the catalyst particles.

EXAMPLE 20

Preparing Magnesium Chloride Precursor

A 50 gallon reactor was charged with 10 gallons of hexane, 333 g (13.7 mol) finely divided Mg powder, and 10 g (39 mmol) iodine. After heating to 70° C., n-butylchloride was added to the reactor at a rate of 29 mL/min. for 57 minutes, totalling 1.7 L (16 mol) n-butylchloride. After maintaining the reactor at 70° C. for 4 hours, the product was cooled to ambient temperature and isolated as a hexane slurry. Dried product had 17.2% Mg, 41.4% Cl, 23.8% C and 4.6% H.

EXAMPLE 21

Preparing a Ti Reverse Addition Catalyst Precursor

A 250 gallon reactor under $N_2$ blanket was charged with 30 gallons hexane, 370 mL (1.35 mol) Ti(O—n—$C_3H_7$)$_4$, 150 mL (1.37 mol) TiCl$_4$, and 1575 mL (15 mol) n-butylchloride. This mixture was heated to 85° C., and the slurry of Example 20 was added slowly over a 1 hour time period. A total of 60 additional gallons of hexane were added. The resulting brown slurry was stirred at 85° C. for an additional 2 hours, after which time stirring ceased and the product was allowed to settle. Within 15 minutes, the brown catalyst had settled, leaving a colorless supernatant of which 60 gallons was decanted from the reactor at ambient temperature. The resulting brown slurry was washed with 2×60 gallon aliquots of hexane and stored as a slurry.

COMPARATIVE EXAMPLE D

A catalyst was prepared as in Example 21, substituting 300 mL (2.72 mol) TiCl$_4$ in place of the TiCl$_4$ and Ti(O—n—$C_3H_7$)$_4$ of Example 21. Little settling of catalyst was observed after 15 minutes, and the supernatant appeared brown. The settling time was extended, and after 2 hours, the supernatant that was removed from the reactor continued to exhibit a brown hue.

The synthesis of catalyst precursor by the method of Comparative Example D above produced 65% and 88% catalyst precursor losses by weight in separate syntheses. The average particle size of the precursor losses was approximately 8 microns. Synthesis of catalyst precursor by the method of Example 21 produced only 10%, 5%, 10%, and 7% catalyst precursor losses in separate syntheses. Synthesis of reverse addition catalyst precursor preferably results in less than about 50% catalyst precursor losses, and more preferably less than about 15–25% catalyst precursor losses. These examples show that reverse addition catalyst precursor particles are bigger and more uniformly shaped than prior-art catalyst precursor and, in turn, produce larger and more uniform prepolymer particles than prior-art methods.

Catalyst precursor losses for Example 21 and Comparative Example D were measured by mass balance by subtracting the mass of transition metal present in the recovered prepolymer from the amount of transition metal originally introduced into the reactor, then dividing this number by the amount of transition metal originally introduced into the reactor.

COMPARATIVE EXAMPLE E

Catalyst was prepared substantially by the method of Comparative Ex. A, substituting titanium tetra-n-propoxide for titanium tetraisopropoxide, and prepolymer was produced in hexane in a 250 gallon reactor at 74° C. by reacting about 210 lb. ethylene, about 0.14 lb. hydrogen, and the catalyst of Comparative Ex. B in the presence of enough TNOA to give a molar ratio of about 0.8:1 Al/Ti. The resultant prepolymer was filtered from the slurry, dried with hot nitrogen, and was fed to a gas-phase polymerization reactor substantially like the one disclosed in U.S. Pat. No. 5,077,358 to Durand et al., Example 1, the disclosure of which is incorporated by reference in its entirety herein. The gas-phase reactor was maintained at 74° C. while 150 lb/hr. ethylene, 0.3 lb/hr. $H_2$, 0.25% triethylaluminum (TEA) in isopentane in a quantity sufficient to control contaminants, and varying amounts of 1-hexene were fed to the reactor. Table III shows the density of the copolymer as a function of the amount of comonomer fed to the reactor.

EXAMPLE 22

Catalyst of Example 15 was prepolymerized and fed to the gas-phase reactor by the method of Comparative Example E. Table III shows the density of the copolymer as a function of the amount of comonomer fed to the reactor.

TABLE III

| 1-hexene feed rate, lb/hr. | Comp. Ex. E | Ex. 22 |
| --- | --- | --- |
| 21 | 0.928 | 0.920 |
| 27 | — | 0.918 |
| 30 | 0.920 | 0.916 |
| 33 | 0.918 | — |

Table III shows that reverse addition catalyst of this invention incorporated comonomer into the ethylene copolymer more effectively than prior-art catalyst could.

Reverse addition catalyst of this invention differs in many regards from prior-art catalysts. Reverse addition synthesis provides catalyst precursor that is hollow and spherically-shaped, with few catalyst precursor fines being produced. Reverse addition catalyst produces prepolymer having less fines than normal addition catalyst produces. Reverse addition catalyst exhibits higher hydrogen response than normal addition catalyst, and reverse addition catalyst incorporates more comonomer into copolymer than normal addition catalyst.

Where the terms of art "comprising", "consisting essentially of", and "consisting of" are used within the elements of the following claims, each term is defined to have the meaning it would have when used in the transition from the preamble of the claim to the body of the claim.

What is claimed is:

1. A polymerization catalyst precursor prepared by the process comprising adding a magnesium source to a solution containing an alkyl halide and at least one transition metal compound:

wherein the magnesium source is represented by the formula $$MgR_qX_{(2-q)}$$

wherein R is an alkyl group containing from 2 to 8 carbon atoms, X is a halide, and q is a number from 0.1 to 1.9, inclusive;

wherein the at least one transition metal compound is represented by the formula $$M(OR')_sX'_{(t-s)}$$

wherein M is titanium and/or vanadium, R' is an alkyl group having from 1 to 8 carbon atoms, X' is halide, t is 3 or 4, and s is an integer between 1 and 4, inclusive, wherein (t-s) is at least one;

wherein the alkyl halide contains from 2 to 8 carbon atoms; and wherein there is not more than 26.7% catalyst precursor loss during preparation.

2. The catalyst precursor of claim 1 wherein the transition metal compound comprises $VOCl_3$, $VCl_4$, vanadium tetrabutoxide, titanium tetrachloride, titanium tetra(normal-propoxide) or titanium tetraisopropoxide.

3. The catalyst precursor of claim 1 wherein M comprises titanium and vanadium.

4. The catalyst precursor of claim 3 wherein the transition metal compound comprises $VOCl_3$, $VCl_4$, vanadium tetrabutoxide, titanium tetrachloride, titanium tetra(normal-propoxide) or titanium tetraisopropoxide.

5. The catalyst precursor of claim 1 wherein q is about 1.

6. The catalyst precursor of claim 5 wherein the transition metal compound comprises $VOCl_3$, $VCl_4$, vanadium tetrabutoxide, titanium tetrachloride, titanium tetra(normal-propoxide) or titanium tetraisopropoxide.

7. The catalyst precursor of claim 5 wherein M comprises titanium and vanadium.

8. The catalyst precursor of claim 7 wherein the transition metal compound comprises $VOCl_3$, $VCl_4$, vanadium tetrabutoxide, titanium tetrachloride, titanium tetra(normal-propoxide) or titanium tetraisopropoxide.

9. The catalyst precursor of claim 1 wherein the alkyl halide is butyl chloride.

10. The catalyst precursor of claim 1 wherein M is titanium.

11. The catalyst precursor of claim 10 wherein the transition metal compound comprises a titanium tetraalkoxide and a titanium tetrahalide.

12. The catalyst precursor of claim 11 wherein the transition metal compound comprises a titanium tetrapropoxide.

13. The catalyst precursor of claim 12 wherein the magnesium source comprises butylmagnesium chloride.

14. A catalyst precursor according to claim 1 comprising spheroidal particles.

15. A catalyst precursor according to claim 1 wherein the mole ratio of magnesium to transition metal is in the range of about 2:1 to about 10:1.

16. A catalyst precursor according to claim 1 prepared under conditions which include a reaction temperature in the range of from 60° C. to 90° C.

17. The catalyst precursor according to claim 1 wherein X is chloride.

18. The catalyst precursor according to claim 17 wherein the mole ratio of transition metal compound to alkyl halide is in the range of from about 0.01 to about 0.2.

19. The catalyst precursor according to claim 18 wherein the alkyl halide is butyl chloride or propyl chloride.

20. A process for preparing a polymerization catalyst precursor comprising adding a magnesium source to a solution containing an alkyl halide and at least one transition metal compound:

wherein the magnesium source is represented by the formula $$MgR_qX_{(2-q)}$$

wherein R is an alkyl group having from 1 to 8 carbon atoms, X is a halide, and q is a number from 0.1 to 1.9, inclusive;

wherein the at least one transition metal compound is represented by the formula $$M(OR')_sX'_{(t-s)}$$

wherein M is titanium and/or vanadium, R' is an alkyl group having from 1 to 8 carbon atoms, X' is halide, t is 3 or 4, and s is an integer between 1 and 4, inclusive, and (t-s) is at least one;

wherein the alkyl halide contains from 2 to 8 carbon atoms; and wherein there is not more than 26.7% catalyst precursor loss during preparation.

21. The method of claim 20 wherein the transition metal compound comprises $VOCl_3$, $VCl_4$, vanadium tetrabutoxide, titanium tetrachloride, titanium tetra(normal-propoxide) or titanium tetraisopropoxide.

22. The method of claim 20 wherein M comprises titanium and vanadium.

23. The method of claim 22 wherein the transition metal compound comprises $VOCl_3$, $VCl_4$, vanadium tetrabutoxide, titanium tetrachloride, titanium tetra(normal-propoxide) or titanium tetraisopropoxide.

24. The method of claim 20 wherein q is about 1.

25. The method of claim 24 wherein the transition metal compound comprises $VOCl_3$, $VCl_4$, vanadium tetrabutoxide, titanium tetrachloride, titanium tetra(normal propoxide) or titanium tetraisopropoxide.

26. The method of claim 24 wherein M comprises titanium and vanadium.

27. The method of claim 26 wherein the transition metal compound comprises $VOCl_3$, $VCl_4$, vanadium tetrabutoxide, titanium tetrachloride, titanium tetra(normal-propoxide) or titanium tetraisopropoxide.

28. The method of claim 20 wherein the alkyl halide is butyl chloride.

29. A polymerization catalyst prepared by the process of claim 20.

30. The catalyst of claim 29, wherein the organoaluminum compound comprises a trialkylaluminum compound.

31. The catalyst of claim 30, wherein the trialkylaluminum compound comprises triethylaluminum or tri-n-octyl aluminum or both.

32. A process according to claim 20 that results in less than about 15% catalyst precursor losses.

33. A prepolymer, useful for the polymerization of olefins, obtained by the process comprising:

(1) reacting a catalyst precursor formed by the method of claim 20 with (2) an activator which is an organometallic compound or compounds of a metal of Groups II or III of the Periodic Table; and (3) contacting the product of step (2) with a sufficient amount of olefin, under olefin polymerization conditions, such that the prepolymer obtained has a melt index in the range of about 0.1 to about 5.

34. The prepolymer of claim 33 wherein said activator comprises an organoaluminum compound.

35. A polymerization catalyst precursor prepared by the process comprising adding a magnesium source to a solution containing an alkyl halide and at least one transition metal compound:

wherein the magnesium source is represented by the formula $$MgR_qX_{(2-q)}$$

wherein R is an alkyl group containing from 2 to 8 carbon atoms, X is a halide, and q is a number from 0.1 to 1.9, inclusive;

wherein the at least one transition metal compound is represented by the formula $$M(OR')_sX'_{(t-s)}$$

wherein M is titanium and/or vanadium, R' is an alkyl group having from 1 to 8 carbon atoms, X' is halide, t is 3 or 4, and s is an integer between 0 and 4, inclusive;

wherein the alkyl halide contains from 2 to 8 carbon atoms; and wherein there is not more than 26.7% catalyst precursor loss during preparation.

36. A polymerization catalyst precursor prepared by the process comprising adding a magnesium source to a solution containing an alkyl halide and at least one transition metal compound:

wherein the magnesium source is represented by the formula $$MgRX$$

wherein R is an alkyl group containing from 2 to 8 carbon atoms, X is a halide;

wherein the at least one transition metal compound is represented by the formula $$M(OR')_sX'_{(t-s)}$$

wherein M comprises titanium, R' is an alkyl group having from 1 to 8 carbon atoms, X' is halide, t is 3 or 4, and s is an integer between 1 and 4, inclusive, wherein (t-s) is at least one;

wherein the alkyl halide contains from 2 to 8 carbon atoms; and wherein there is not more than 26.7% catalyst precursor loss during preparation.

37. A polymerization catalyst precursor prepared by the process comprising adding butylmagnesium chloride to a solution prepared by combining butyl chloride, titanium tetrapropoxide, and titanium tetrachloride.

* * * * *